United States Patent
Han et al.

(10) Patent No.: US 12,261,709 B2
(45) Date of Patent: Mar. 25, 2025

(54) ENABLING TWO-WAY COMMUNICATION WITH VIDEO CONFERENCE WAITING ROOMS

(71) Applicant: Zoom Video Communications, Inc., San Jose, CA (US)

(72) Inventors: Lin Han, Los Altos, CA (US); Nitasha Walia, Sunnyvale, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/245,202

(22) Filed: Apr. 30, 2021

(65) Prior Publication Data
US 2022/0353098 A1    Nov. 3, 2022

(51) Int. Cl.
*H04L 12/18* (2006.01)
*H04N 7/14* (2006.01)
*H04N 7/15* (2006.01)

(52) U.S. Cl.
CPC ...... *H04L 12/1822* (2013.01); *H04L 12/1818* (2013.01); *H04L 12/1831* (2013.01); *H04N 7/147* (2013.01); *H04N 7/152* (2013.01)

(58) Field of Classification Search
CPC ............. H04L 12/1822; H04L 12/1818; H04L 12/1831; H04N 7/147; H04N 7/152
See application file for complete search history.

(56) References Cited

U.S. PATENT DOCUMENTS

| | | | | |
|---|---|---|---|---|
| 8,300,557 B2 * | 10/2012 | Sekaran | ............... | H04L 12/1822 370/260 |
| 8,749,610 B1 * | 6/2014 | Gossweiler | ......... | H04L 12/1827 348/14.09 |
| 10,999,555 B1 * | 5/2021 | Mautino | ................. | H04N 7/147 |
| 11,196,869 B2 * | 12/2021 | Lee | ........................ | H04M 3/564 |
| 11,258,836 B1 * | 2/2022 | Ou | ....................... | H04L 65/1089 |
| 2010/0095122 A1 * | 4/2010 | Bettger | .................. | H04L 63/065 709/204 |
| 2011/0271212 A1 * | 11/2011 | Jones | ..................... | H04M 3/567 715/753 |
| 2012/0110475 A1 * | 5/2012 | Han | ..................... | H04L 12/1818 715/753 |
| 2012/0234264 A1 | 9/2012 | Benz | | |
| 2012/0254305 A1 * | 10/2012 | Malkin | .............. | G06Q 10/1095 709/204 |
| 2013/0007635 A1 * | 1/2013 | Michaelis | ................ | H04M 3/56 715/753 |
| 2013/0179491 A1 * | 7/2013 | Bennett | ............... | H04L 65/1093 709/203 |

(Continued)

*Primary Examiner* — Nazia Naoreen
(74) *Attorney, Agent, or Firm* — Kilpatrick Townsend & Stockton LLP

(57) ABSTRACT

One example method includes receiving, from a first client device, a request to join a video conference, the video conference having a main meeting, creating, in response to the request, a sub-meeting associated with the main meeting, connecting the first client device to the sub-meeting, connecting a host client device to the sub-meeting simultaneously with the host client device being connected to the main meeting, the host client device associated with a host of the main meeting, receiving first multimedia content from the first client device, and providing the first multimedia content to the host client device.

24 Claims, 9 Drawing Sheets

(56) References Cited

U.S. PATENT DOCUMENTS

| | | | |
|---|---|---|---|
| 2014/0229835 A1* | 8/2014 | Ravine | H04L 65/61 |
| | | | 709/206 |
| 2014/0267550 A1* | 9/2014 | Nimri | H04N 7/152 |
| | | | 348/14.09 |
| 2015/0103136 A1* | 4/2015 | Anderson | H04N 7/155 |
| | | | 348/14.09 |
| 2015/0106629 A1* | 4/2015 | Anderson | H04N 7/152 |
| | | | 726/4 |
| 2020/0177648 A1* | 6/2020 | Araki | H04L 12/1822 |
| 2020/0374146 A1* | 11/2020 | Chhabra | H04L 12/1822 |

\* cited by examiner

ENABLING TWO-WAY COMMUNICATION WITH VIDEO CONFERENCE WAITING ROOMS

FIELD

The present application generally relates to video conferences, and more specifically relates to systems and methods for enabling two-way communication with video conference waiting rooms.

BACKGROUND

Videoconferencing has become a common way for people to meet as a group, but without being at the same physical location. Participants can be invited to a video conference meeting, join from their personal computers or telephones, and are able to see and hear each other and converse largely as they would during an in-person group meeting or event. The advent of user-friendly video conferencing software has enabled teams to work collaboratively despite being dispersed around the country or the world. It has also enabled families and friends to engage with each other in more meaningful ways, despite being physically distant from each other.

SUMMARY

Various examples are described for systems and methods for enabling two-way communication with video conference waiting rooms. One example method includes receiving, from a first client device, a request to join a video conference, the video conference having a main meeting, creating, in response to the request, a sub-meeting associated with the main meeting, connecting the first client device to the sub-meeting, connecting a host client device to the sub-meeting simultaneously with the host client device being connected to the main meeting, the host client device associated with a host of the main meeting, receiving first multimedia content from the first client device, and providing the first multimedia content to the host client device.

One example system includes a communications interface; a non-transitory computer-readable medium; and one or more processors configured to execute processor-executable instructions stored in the non-transitory computer-readable medium to receive, from a first client device, a request to join a video conference, the video conference having a main meeting; create, in response to the request, a sub-meeting associated with the main meeting; connect the first client device to the sub-meeting; connect a host client device to the sub-meeting simultaneously with the host client device being connected to the main meeting, the host client device associated with a host of the main meeting; receive first multimedia content from the first client device; and provide the first multimedia content to the host client device.

One example non-transitory computer-readable medium includes processor-executable instructions configured to cause one or more processors to receive, from a first client device, a request to join a video conference, the video conference having a main meeting; create, in response to the request, a sub-meeting associated with the main meeting; connect the first client device to the sub-meeting; connect a host client device to the sub-meeting simultaneously with the host client device being connected to the main meeting, the host client device associated with a host of the main meeting; receive first multimedia content from the first client device; and provide the first multimedia content to the host client device.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
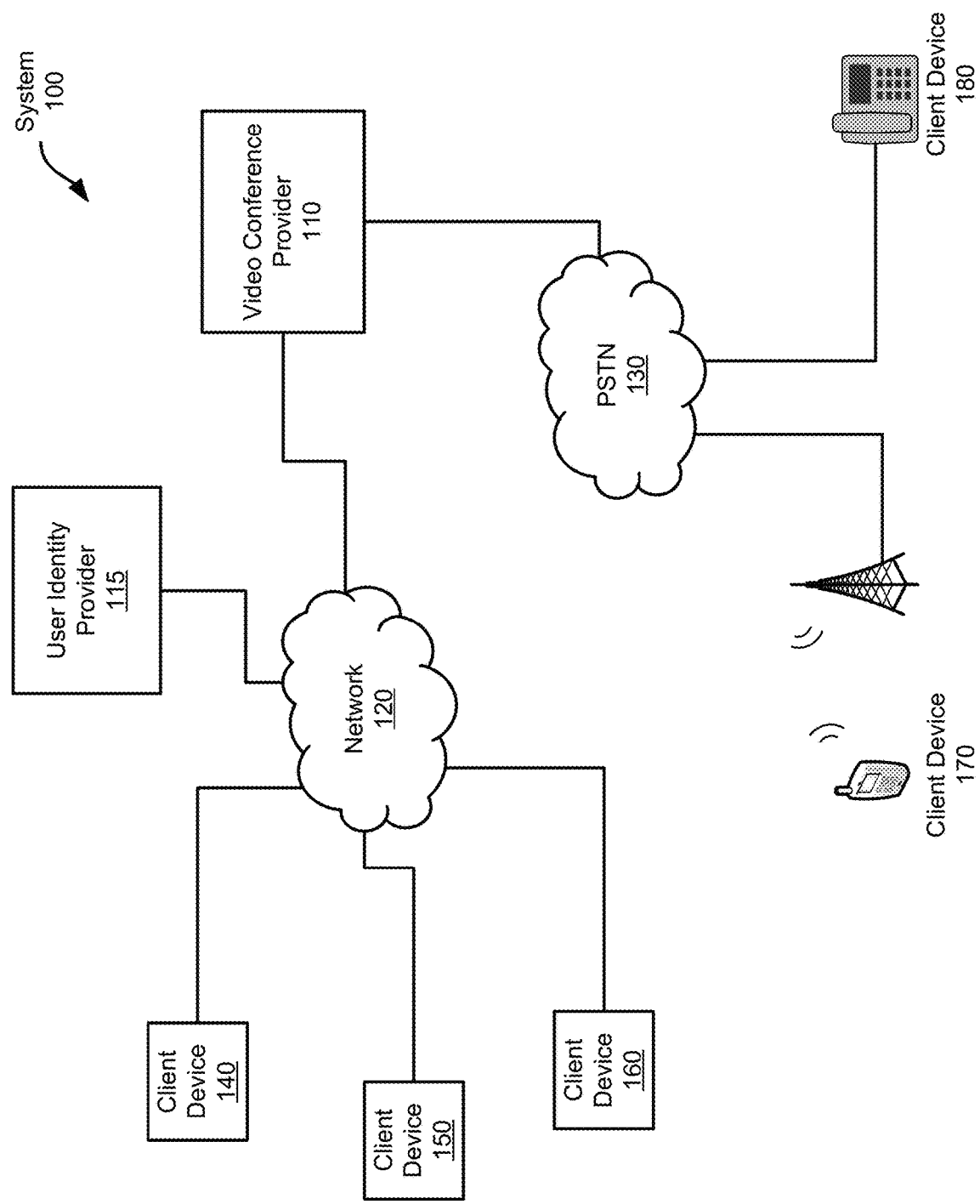
FIGS. 1-3 show example systems for enabling two-way communication with video conference waiting rooms.

Examples are described herein in the context of systems and methods for enabling two-way communication with video conference waiting rooms. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conferencing systems enable their users to create and attend video conferences (or "meetings") via various types of client devices. After joining a meeting, the participants receive audio and video streams or feeds (or "multimedia" streams or feeds) from the other participants and are presented with views of the video feeds from one or more of the other participants and audio from the audio feeds. When participating in video conference meetings, participants may view a graphical user interface ("GUI") provided by video conferencing software that provides various controls the participants can use to interact with the meeting or with other participants, and in which the video feeds of one or more participants may be seen. Such functionality allows the participants to see and hear each other, engage more deeply, and generally have a richer experience despite not being physically in the same space.

To create a meeting, a person (referred to as the "host" or "meeting host") accesses the video conferencing system, schedules a new meeting, and identifies one or more other people to invite to the meeting. In response to the host creating the meeting, the video conference system establishes the meeting by creating a meeting identifier and, if desired, a passcode or other access control information. The host can then send the meeting identifier (and access control information) to each of the invitees, such as by email. Once the meeting is started, the invitees can then access and join the meeting using the meeting identifier and any provided access control information.

When a participant attempts to join a video conference, the video conference provider may initially join them to a waiting room before allowing them to proceed into the main meeting itself. Waiting rooms may be provided in cases where the meeting host has not yet joined the meeting, the participant attempts to join the meeting before the scheduled start time, the meeting host desires to approve every participant's entry into the main meeting, etc.

While in a waiting room, the participant may be presented with an empty or otherwise static window (e.g. with text indicating that the user is in a waiting room) by the GUI indicating that the user is waiting to be admitted to the main video conference meeting. Once the user is admitted to the meeting, they will be able to view video feeds from other participants, but until then, they are simply presented with the static waiting room screen.

In existing systems, waiting rooms may be provided by admitting the participant to the main meeting of a video conference, but not providing cryptographic keys that would enable access to the multimedia streams exchanged amongst the participants in the meeting. Thus, the waiting room itself is not a separate meeting from the main meeting, but is instead highly limited access to the main meeting.

However, because waiting rooms involve the participant connecting to the main meeting, but being denied access to cryptographic keys that would enable communication with other participants in the meeting, participants in the waiting room have no way to contact the meeting host or to otherwise interact. Instead, the participants must simply wait to be admitted or resort to communications methods outside of the video conference software used to access the video conference, such as emails, text messages, etc. But these other communication methods may be less effective because the video conference participants are likely engaged with the video conference and paying less attention to other events.

To enable communication with participants in a waiting room, when a new participant requests access to the main meeting of a video conference, the video conference provider instead creates a sub-meeting for the video conference and associates it with the main meeting. The new participant is then joined to the sub-meeting. The host of the main meeting is also joined to the sub-meeting, but is not disconnected from the main meeting. New cryptographic keys created for the sub-meeting are then distributed to the host and the new participant to enable them to communicate with each other as though they were in an ordinary video conference. Though because the host is also participating in the main meeting, they may be presented with the option to select which meeting to interact with at any given time. For example, when the new participant arrives, the host may be provided with a separate region or window within their GUI that is associated with the sub-meeting that allows them to view a video stream from the new participant. They may also have the option to mute or unmute audio from the sub-meeting. However, the host may select whether to present video or audio to the sub-meeting or to the main meeting. This allows the host to participate in the main meeting and, when the opportunity presents itself, to switch their interaction to the sub-meeting to communicate with the new participant. In addition, the host and the new participant may communicate using integrated text messaging via the video conference software.

Once the host is ready to admit the new participant to the main meeting, they may select the appropriate option in the GUI and the cryptographic keys for the main meeting will be distributed to the new participant, who may begin exchanging encrypted multimedia streams with the other participants in the meeting. In addition, the video conference system disconnects the new participant and the host from the waiting room, and then terminates the sub-meeting.

By employing these and other techniques, new participants to a video conference may be held in a waiting room, but allowed to have meaningful interactions with the host of the video conference. Further, by allowing the host to connect to the waiting room without leaving the main meeting (or other sub-meeting), disruptions to the main meeting can be reduced. While the host will be notified of the new participant and be able to communicate with them, the host can continue to participate in the main meeting and defer the need to communicate with the new participant until a more suitable time.

This illustrative example is given to introduce the reader to the general subject matter discussed herein and the disclosure is not limited to this example. The following sections describe various additional non-limiting examples and examples of systems and methods for enabling two-way communication with video conference waiting rooms.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
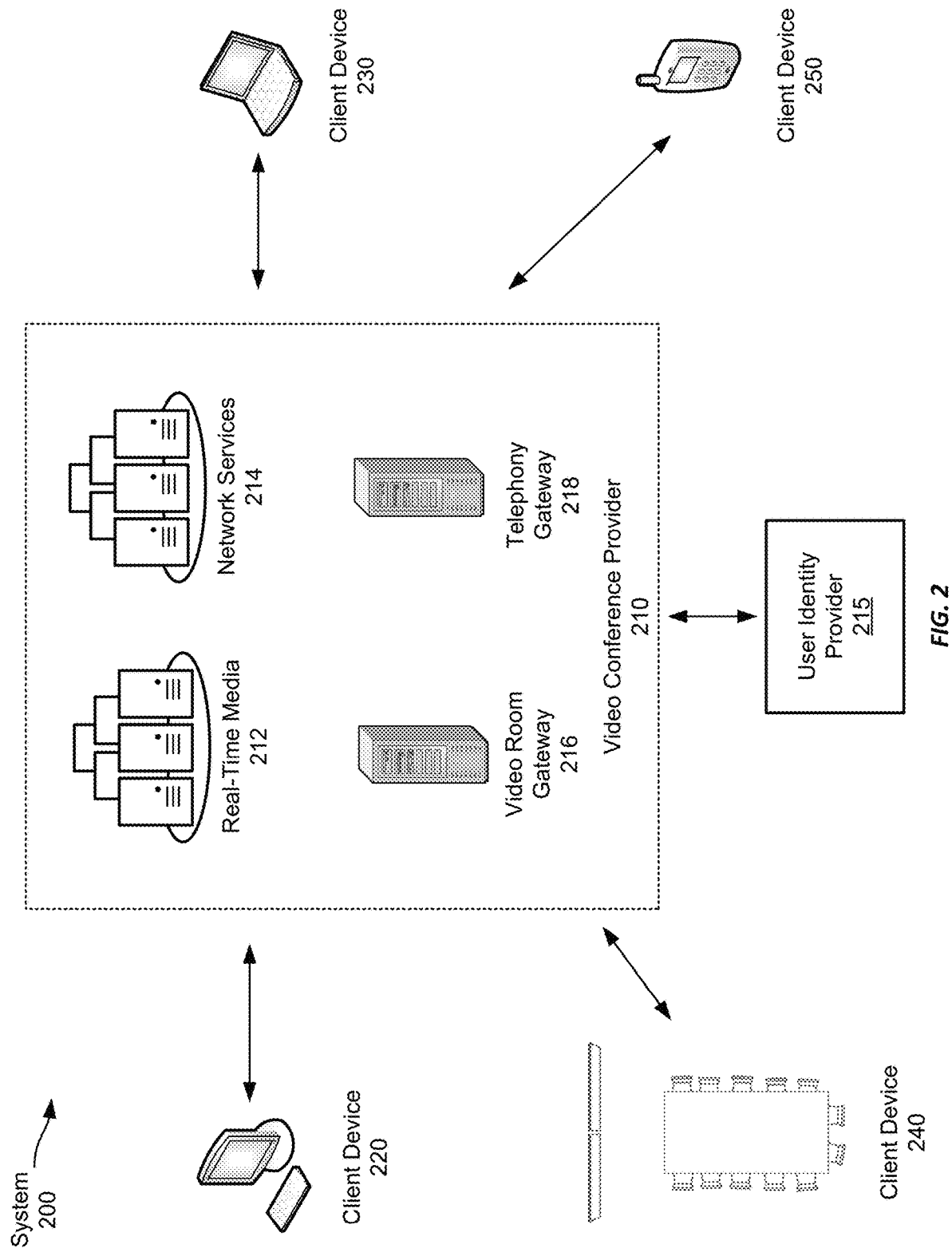

Video conference provider 110 allows clients to create video conference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common video conference may be used. Further, in some examples, and as alluded to above, a meeting may also have "breakout" rooms. Such breakout rooms may also be rooms that are associated with a "main" video conference room. Thus, participants in the main video conference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
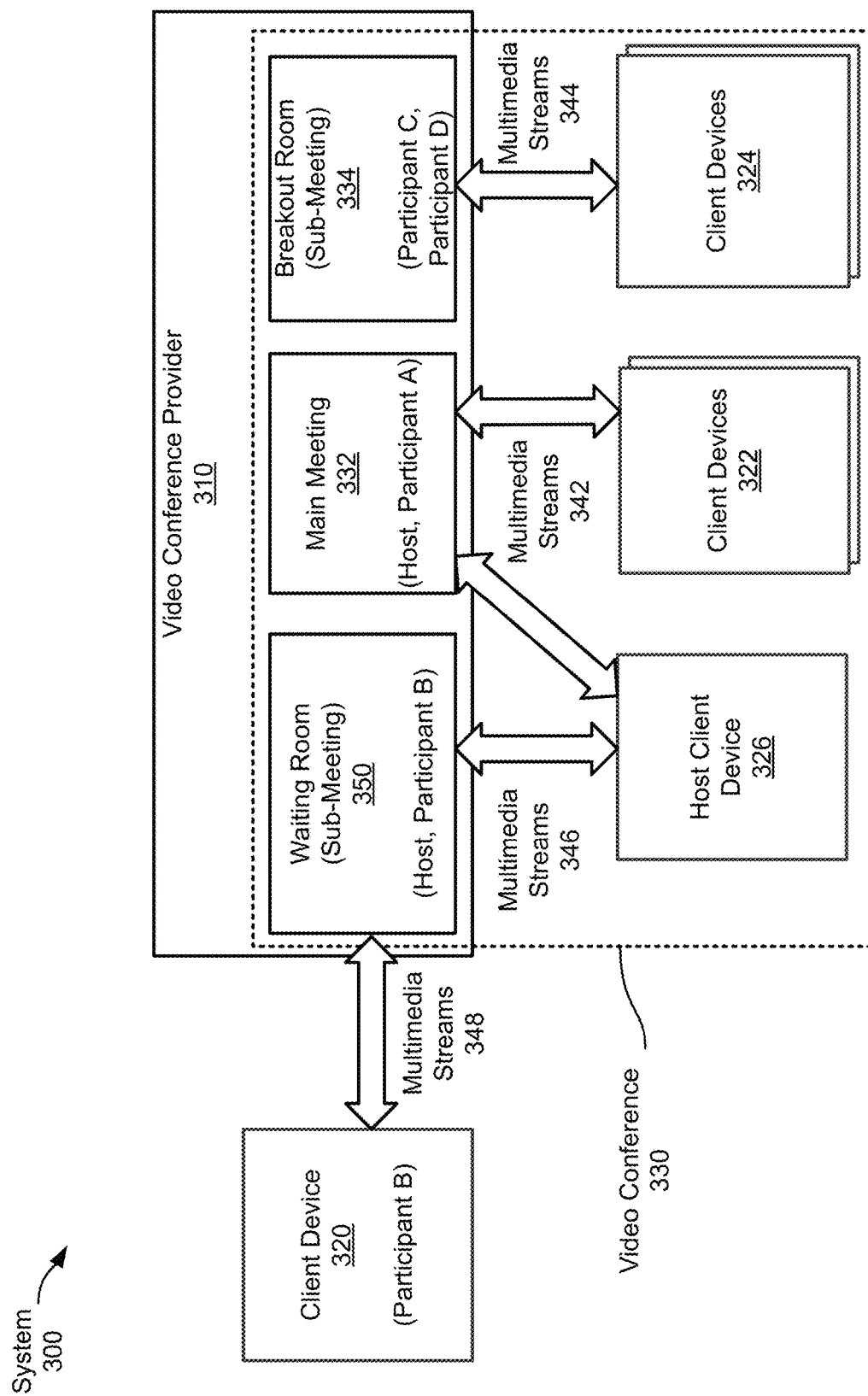

Referring now to FIG. 3, FIG. 3 shows an example system 300 for enabling two-way communication with video conference waiting rooms. In this example, the system 300 includes video conference provider 310, generally as discussed above with respect to FIGS. 1-2. The system 300 shows more detail of different functionality provided by the video conference provider 310 to enable providing waiting rooms in conjunction with other video conferences. The video conference provider 310 can create a video conference 330 that includes a main meeting 332 to which various participants can join. The main meeting 332 then becomes the virtual nexus through which the participant client devices 322, including the host client device 326, connect and exchange multimedia streams 342 to interact with each other. The video conference provider 310 may also enable video conferences 330 to employ breakout rooms 334 from main meetings 332 to allow subsets of participants (e.g. participants C and D) in the main meeting to exit the main meeting and join the breakout room, via their client devices 324, to discuss any topics of relevance, but without leaving the video conference 330.

When a new participant, e.g., participant B, uses their client device 320 to attempt to join the video conference 330, the video conference provider 310 receives the request and determines that the video conference 330 has been configured to require new participants to be placed into a waiting room 350 before they will be admitted to the video conference 330.

In this example, the video conference provider 310 establishes a new sub-meeting to serve as the waiting room 350 in response to receiving the request from the client device 320 to join the meeting. The new sub-meeting 350 is associated with the main meeting of the video conference and the client device 320 is connected to it. In addition, the video conference provider 310 connects the host client device 326 to the waiting room 350, but without disconnecting the host client device 326 from the main meeting 332. Further, as a part of establishing the waiting room 350, the video conference provider 310 creates and distributes a new cryptographic key or keys (different from any cryptographic keys used to encrypted multimedia streams 342, 344 exchanged in the main meeting 332 or the breakout room 334) to the client device 320 and the host client device 326 to enable them to exchange encrypted multimedia streams 346, 348 within the waiting room 350.

In some examples, however, the participants may employ end-to-end ("E2E") encryption to encrypt multimedia streams. E2E encryption involves the host or another participant creating and distributing cryptographic keys to the other participants for them to use to encrypt and decrypt multimedia streams, but not providing those keys to the video conference provider 310. Thus, while the multimedia streams traverse the video conference provider 310, the video conference provider 310 is not able to decrypt any of the streams. In one such example, the host client device 326, rather than the video conference provider 310, creates and distributes the new cryptographic key to the client device 320 to enable communication within the waiting room.

Once the two client devices 320, 326 have been connected to the waiting room 350 and have obtained cryptographic keys, they may exchange multimedia streams 346, 348 to communicate as though they were in a conventional sub-meeting: they may exchange video and audio streams, they may send text messages to each other via the video conference provider 310, etc. For example, the host of the video conference 330 may have scheduled a second video conference to follow the on-going video conference 330, and participant B, using client device 320, attempted to join the second video conference. However, because the on-going video conference 330 had not concluded, but was being hosted by the same host, the client device 320 was connected to a waiting room for the on-going video conference 330.

When the client device 320 is connected to the waiting room, the host is notified that the new participant has arrived and is provided the option to connect to the waiting room 350. Once the host connects to the waiting room, the host and the participant are able to communicate. For example, the host can send a message to the new participant that the on-going video conference 320 is running long and that the next meeting will begin shortly. The participant can send a suitable response, and, when the on-going meeting concludes, the host can admit the participant to the main meeting and begin the next meeting. Or the host can terminate the on-going meeting once it has concluded and establish a new video conference to host the second meeting. In one such example, the host can provide the new participant with information to join the new video conference via the waiting room before terminating the on-going meeting.

Figure 4:
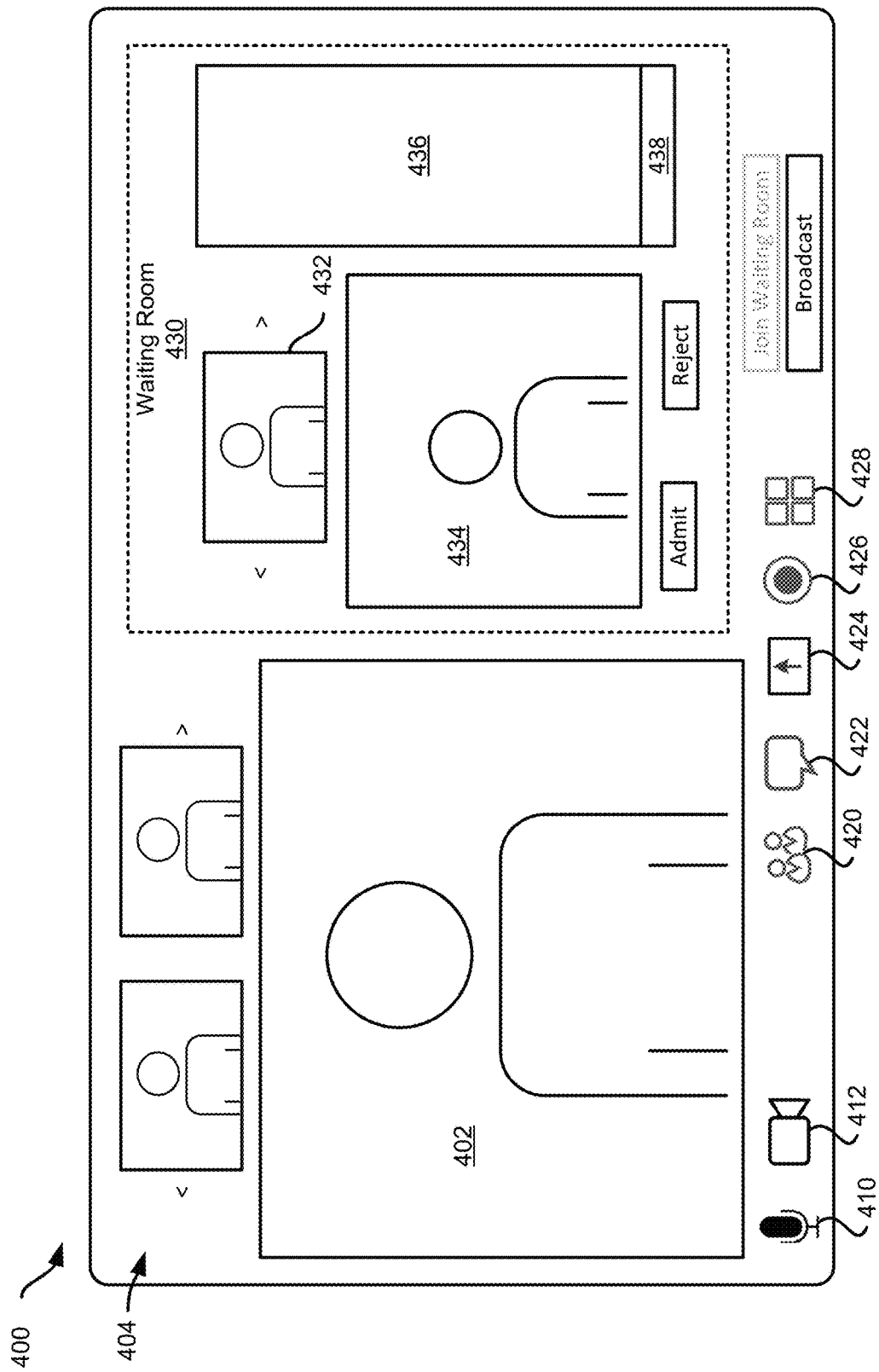
FIGS. 4-5 show example graphical user interfaces suitable for use with various systems and methods for enabling two-way communication with video conference waiting rooms.
Figure 5:
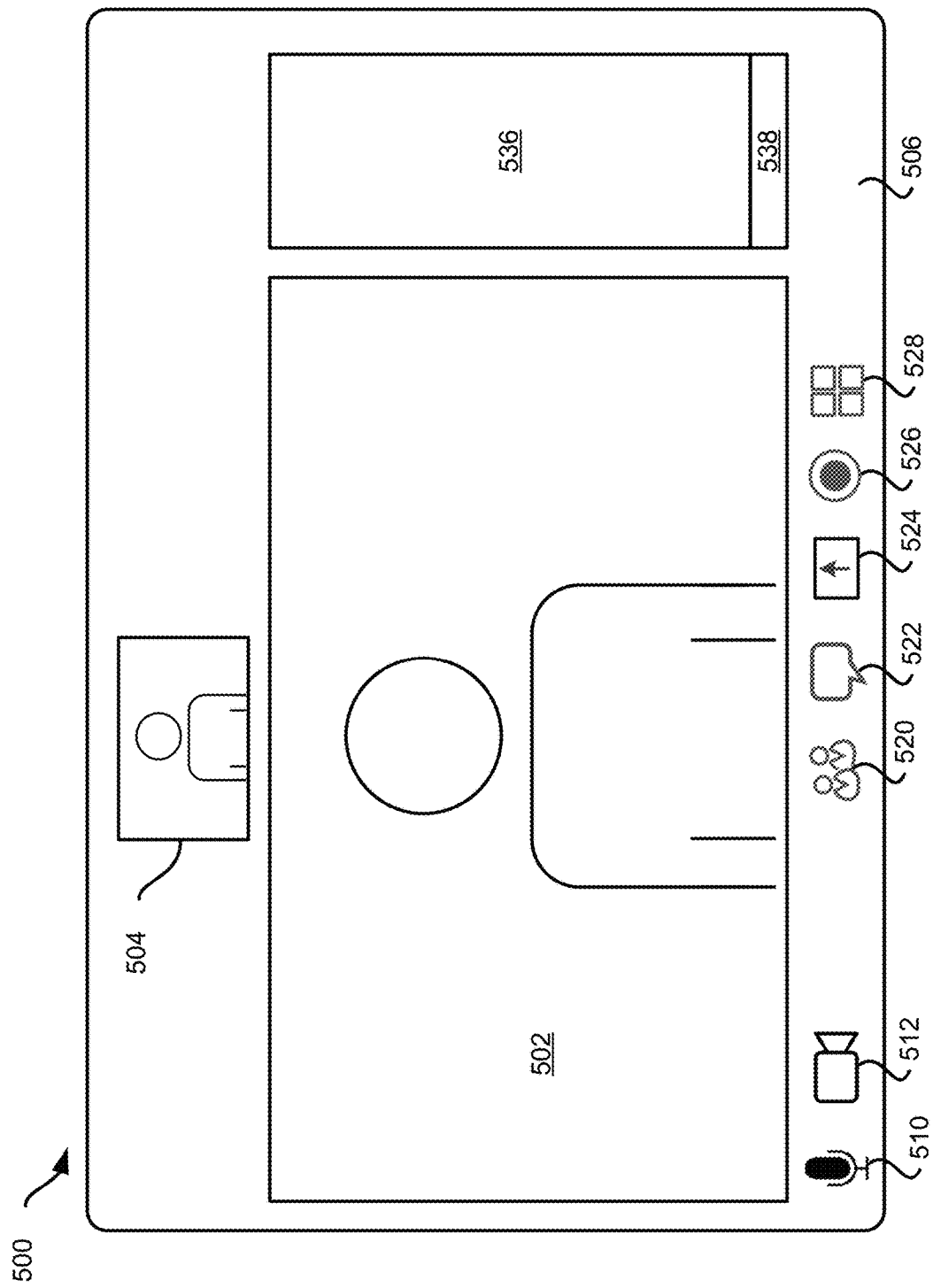

Referring now to FIGS. 4-5, FIG. 4 shows an example GUI 400 presented to the host of the video conference 300 discussed above with respect to FIG. 3. The host client device 326 executes video conference software, which in turn displays the GUI 400 on the host client device's display. In this example, the GUI 400 includes a speaker view window 402 that presents the current speaker in the main meeting 332. Above the speaker view window 402 are smaller participant windows 404, which allow the host to view other participants in the main meeting 332, as well as controls ("<" and ">") to let the host scroll to view other participants in the meeting 332.

Adjacent to the speaker view window 404 is a separate set of view windows 432-434 corresponding to the waiting room 350, which the host client device 326 has been connected to. The waiting room region 430 is displayed as separate and discrete from the main meeting windows 402-404 to convey that they are associated with a different meeting room. Within the waiting room region 430 are a participant view window 434, which provides video images supplied by the camera connected to client device 320. If no camera is available, or the participant has disabled sending video streams, the participant view window 434 may be empty, may include the participant's name, or may show a silhouette of a person to indicate that a participant is present in the waiting room. In addition, and similar to the participant windows 404 in the main meeting 332, the waiting room region 430 includes participant windows 432 with controls ("<" and ">") to scroll through any other participants that may be in the waiting room 350. In this example, because only two participants are in the waiting room (the host and the new participant), only the host is shown in the participant window 432 while the new participant is shown in the participant view window 434.

In addition to the participant windows 432-434, the waiting room region 430 also includes a text message 436 window and a text entry field 438 to allow the host to exchange text messages with the participant in the waiting room. Thus, the host may continue to participate in the main meeting 332 using video and audio streams, while typing messages to the participant in the waiting room 350 using the text entry field 438.

Beneath the speaker view window 402 are a number of interactive elements 410-428 to allow the host to interact with the video conference software. Controls 410-412 may allow the host to toggle on or off audio or video streams captured by a microphone or camera connected to the host client device 326. Control 420 allows the participant to view any other participants in the meeting with the participant, while control 422 allows the user to send text messages to other participants, whether to specific participants or to the entire meeting. Control 424 allows the participant to share content from their client device. Control 426 allows the participant toggle recording of the meeting, and control 428 allows the user to select an option to join a breakout room.

In addition to these controls, the waiting room region 430 also includes "admit" and "reject" buttons to either admit the new participant into the main meeting 332, or to reject the participant, such as if the host does not recognize the participant (e.g., the participant is attempting to gain unauthorized access to the main meeting). If the host selects the reject option, the participant's client device 320 will be disconnected from the waiting room 350 and denied access to the main meeting 332. In addition, a "Join Waiting Room" option is available, but has been greyed out since the host has already joined the waiting room. The "Join Waiting Room" option may activate when a new participant has joined the waiting room 350. This may allow the host to control whether or not they are joined to the waiting room and when. After selecting the option, the GUI 400 is adjusted to present the waiting room region 430 as depicted. Prior to entering the waiting room, the GUI may not include a waiting room region 430, and instead, the main meeting 332 speaker and participant windows 402-404 may be centered in the GUI 400. When the host needs to interact with the main meeting, rather than the waiting room, they may select the speaker view for the main meeting or otherwise select functionality related to the main meeting to return to the main meeting, but without exiting the waiting room.

While in this example, the host will typically only interact with one participant in the waiting room at a time, such as by using the participant window controls ("<" and ">") to select a participant to communicate with, in some examples, the host may need to provide information to all participants in the waiting room. To do so, the host may toggle the "Broadcast" control. When broadcasting is enabled, the host's multimedia streams will be sent to all participants in the waiting room. However, when it is disabled, the host's multimedia streams will only be sent to the selected participant.

Referring now to FIG. 5, FIG. 5 shows another example GUI 500, which is presented to the new participant upon entering the waiting room 350. The GUI 500 includes the same controls 510-528 as well as a speaker window 502, a participant window 504, and a text message window 536 and text entry field 538, generally as discussed above with respect to FIG. 4. In this example, the video conference provider 310 connects the new participant to the waiting room 350, at which time the GUI 500 is presented to the participant via their client device 320. The client device 320 receives a cryptographic key from the video conference provider (or the host's client device 326, if E2E encryption is employed), and begins providing video and audio streams in the waiting room. The new participant's own video stream is presented in participant window 504, while any video stream received from the host's client device is presented in the speaker window 502. If no video stream is provided for either or both windows, the respective window instead provides an indication of the respective participant, e.g., the host's name is presented in speaker window 502.

As discussed above with respect to FIG. 4, the host may join the waiting room, such as by selecting the "Join Waiting Room" option, at which time they may interact with the new participant via video, audio, or text messages. If the new participant is admitted to the main meeting 332, their GUI may change to provide views similar to those in FIG. 4 related to the main meeting 332.

Figure 6A:
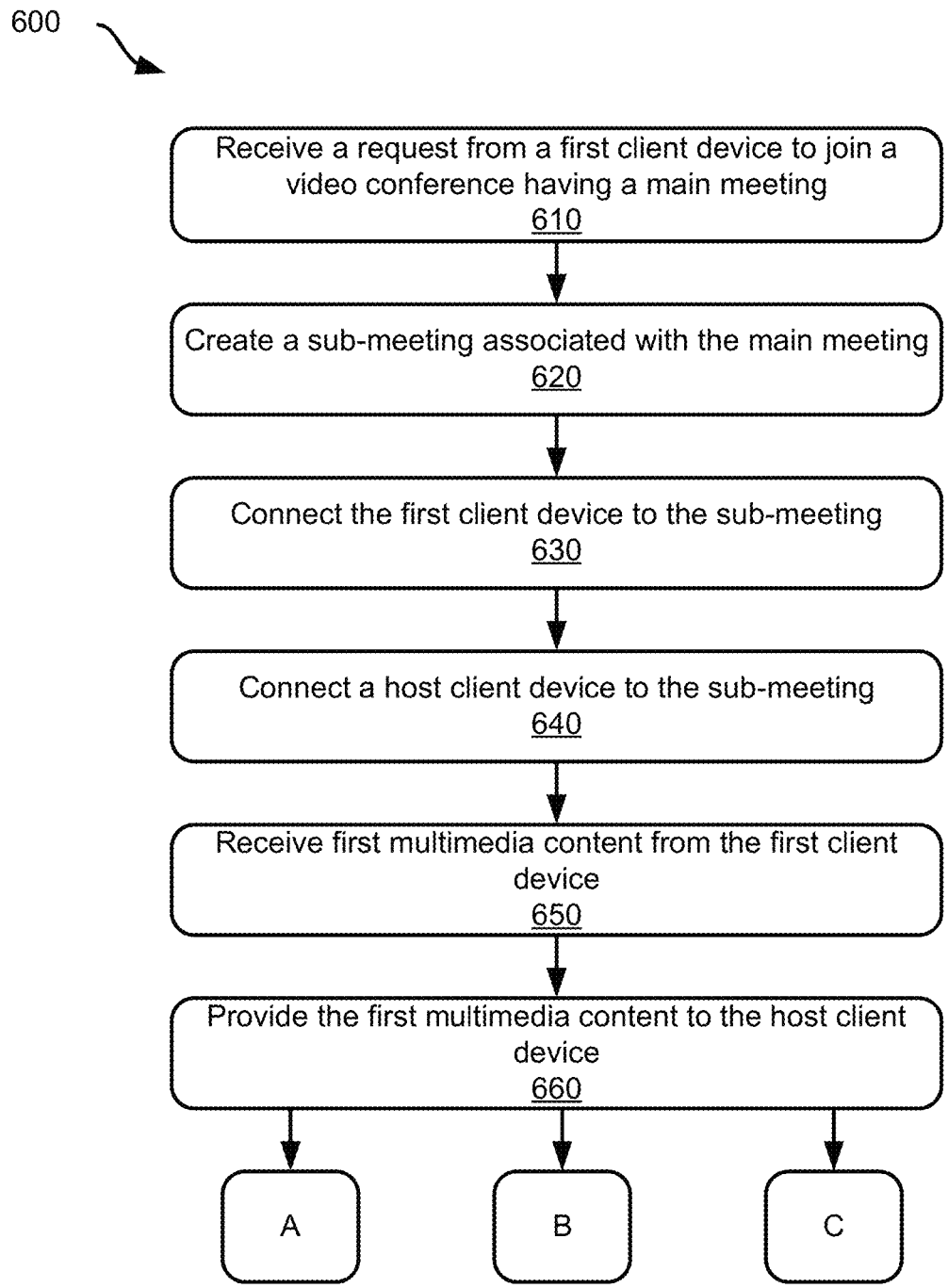
FIGS. 6A-6D shows example methods for enabling two-way communication with video conference waiting rooms.
Figure 6B:
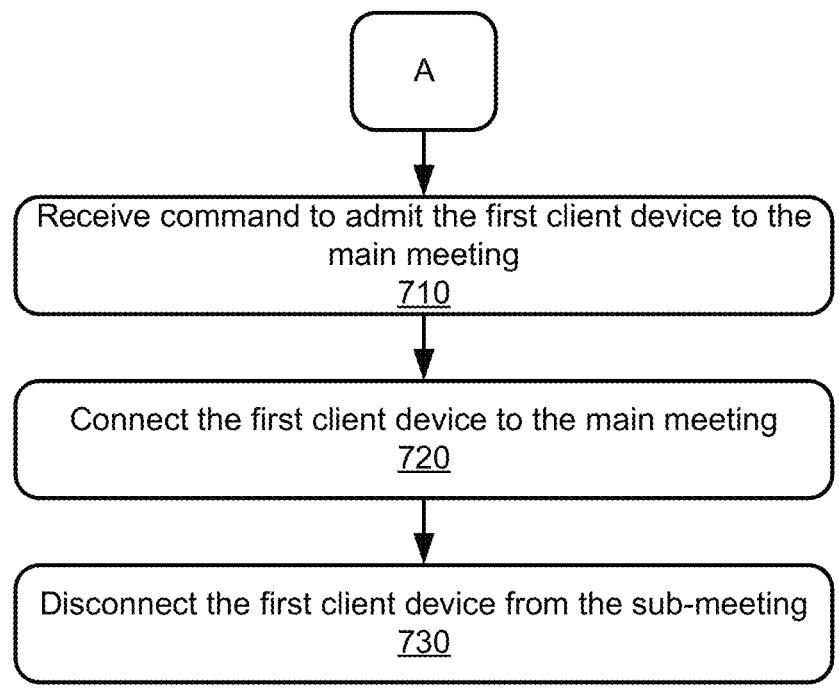
Figure 6C:
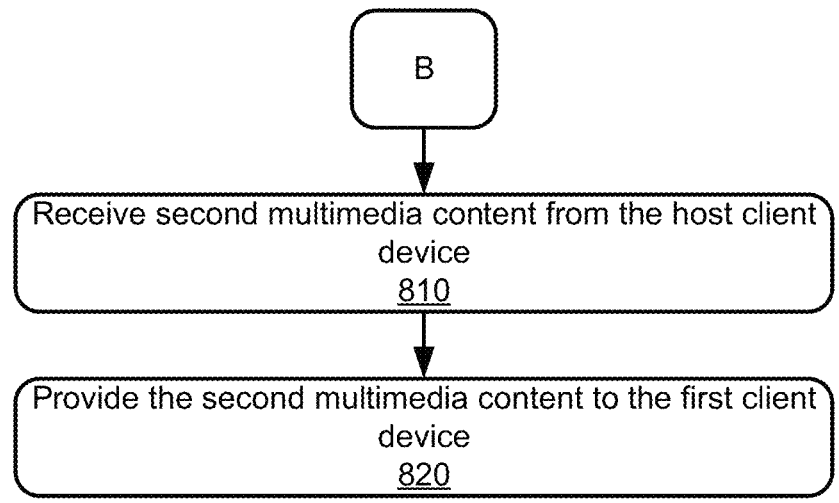
Figure 6D:
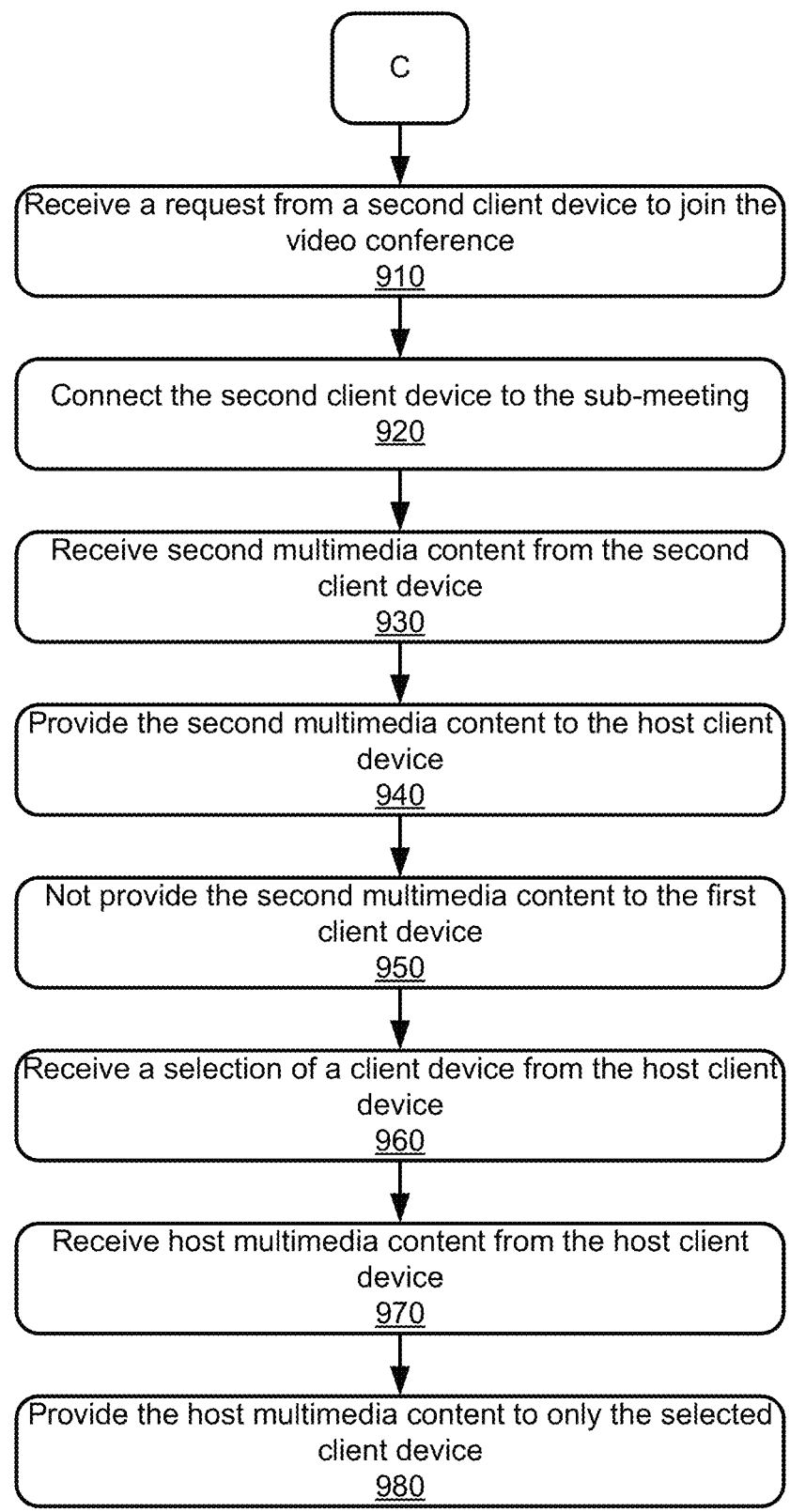

Referring now to FIGS. 6A-6D, FIGS. 6A-6D illustrate an example method 600 according to this disclosure. FIG. 6A illustrates part of the method, while FIGS. 6B-6D show additional parts of the method that may or may occur, depending on actions taken by the host or a participant. The description of FIGS. 6A-6D will be made with reference to the system shown in FIG. 3; however, it should be appreciated that any suitable system according to this disclosure may be employed, including any of the systems 100-200 shown in FIG. 1 or 2.

At block 610, the video conference provider 310 receives a request to join a video conference 330 from a first client device 320. To request access to a video conference, a participant may employ a client device 320 to access a URL or to transmit other information to the video conference provider identifying the video conference to be joined. Depending on when the request is transmitted the video conference may or may not have started. If the video conference has started, a main meeting 332 may be established and be accessible to participants, such as after being admitted by the host of the video conference 330. If the video conference has not yet started, the video conference may still be configured to have a main meeting, but it may not yet have been established. Thus, while the main meeting has not been created, the video conference still has a main meeting that will be established once the video conference has started.

At block 620, in response to receiving the request at block 610, the video conference provider 310 creates a sub-meeting associated with the main meeting, which will serve as the waiting room 350. To create the sub-meeting, video conference provider 310 establishes a new meeting and associates it with the video conference 330. If the main meeting has been established, the new meeting may also be associated with the main meeting 332. As a part of creating the sub-meeting, the video conference provider 310 generates access information, such as a URL or meeting ID (and a passcode, in some examples), that may be used by a client device, e.g., client device 320, to access and join the sub-meeting.

At block 630, the video conference provider 310 connects the first client device to the sub-meeting, which is waiting room 350 in this example. In this example, in response to the request from the first client device 320, the video conference provider redirects the first client device 320 to join the waiting room 350, such as by responding to the request to join the main meeting with access information for the waiting room 350, which the first client device 320 then uses to request access to the waiting room 350. At which time, the video conference provider 310 connects the client device 320 to the waiting room 350. In some examples, however, the video conference provider 310 may internally redirect the client device 320 to the waiting room 350, such as by responding to the request as though the request was a request to join the waiting room 350 and providing access to one or more multimedia streams available in the sub-meeting, while simultaneously not providing access to any multimedia feeds in the main meeting 332 (or any other sub-meetings, e.g., sub-meeting 334) of the video conference 330. The video conference provider 310 may also provide a cryptographic key (or cryptographic keys) to the first client device 320 to enable it to access multimedia streams within the waiting room 350. In an E2E example, however, the first client device 320 may receive a cryptographic key (or keys) from the host client device 326 (or another client device), rather than the video conference provider 310.

At block 640, the video conference provider 310 connects the host client device 326 to the sub-meeting. To connect the host client device 326 to the waiting room 350, the video conference provider 310 transmits one or more messages to the host client device 326 indicating that it is being added to the waiting room 350, which may cause the video conference software executed by the host client device 326 to provide a waiting room region 430, similar to the GUI 400 shown in FIG. 4. Alternatively, the video conference software may generate a separate GUI window dedicated to the waiting room 350. In addition, the video conference provider 310 provides access information to the host client device 326, which allows the host client device 326 to transmit a request to the video conference provider 310 to connect the host client device 326 to the waiting room 350, or the video conference provider 310 may notify the host client device 326 to join the waiting room 350 and provide the corresponding access information.

In some examples, video conference provider 310 may provide one or more multimedia streams to the host client device 326 and identify a meeting identifier for the waiting room 350 as being associated with the multimedia streams to connect the host client device 326 to the waiting room 350. Upon receipt of the multimedia streams and the meeting identifier, the host client device 350 may being exchanging multimedia streams with other participants in the waiting room 350. The video conference provider may also generate and provide cryptographic keys to the host client device 326 to enable access to the multimedia streams, or in an E2E scenario, the host client device may generate and distribute cryptographic keys to the other participants' client devices in the waiting room 350.

At block 650, the video conference provider 310 receives first multimedia content from the first client device 320. In this example, the multimedia content may be one or more multimedia streams, e.g., video, audio, or text.

At block 660, the video conference provider 310 provides the first multimedia content to the host client device 326. As discussed above with respect to FIGS. 1-2, the video conference provider 310 can provide multimedia streams by publishing those streams for other participants, e.g., the host client device 326 in this example, to subscribe to and receive. However, other examples of providing the multimedia streams to the host client device 326 may be employed.

While the discussion of the method 600 above involved the blocks being performed in a particular order, it should be appreciated that other orders are within the scope of this disclosure. For example, blocks 630 and 640 may happen in any order or substantially simultaneously. Further, the functionality at block 650 may occur prior to the functionality at block 640. In addition block 620 may be performed prior to block 610 in some examples. Still other orderings are possible and within the scope of this disclosure.

The example method 600 depicted in FIG. 6A includes blocks A-C, which lead to additional blocks to provide functionality for enabling two-way communication with video conference waiting rooms, as will be discussed below with respect to FIGS. 6B-6D. And while these blocks are depicted as including functionality following block 660, these blocks may be integrated into the method 600 at any block from 610-660. Further, it should be appreciated that if multiple different client devices attempt to join the main meeting 332, the video conference provider 310 may perform this or other example methods multiple times concurrently (or serially) to connect those other client devices to a waiting room. In examples with multiple client devices attempting to join the main meeting, they may each be connected to a separate waiting room using example methods according to this disclosure, though in some examples, some may be connected to the same waiting room as will be described in greater detail below with respect to FIG. 6D. In addition, while FIGS. 6B-6D are depicted as being discrete from each other, the functionality of each of these figures may be performed in conjunction with functionality from any or all of these figures, which may enable flexible and full-featured two-way communications with video conference waiting rooms.

Referring now to FIG. 6B, FIG. 6B shows additional functionality that may be integrated with the example method 600 shown in FIG. 6A. As with FIG. 6A, the discussion of this figure will be made with reference to the system 300 of FIG. 3, but could be used with any suitable system according to this disclosure.

At block 710, the video conference system 310 receives a command to admit the first client device 320 to the main meeting 332. As discussed above with respect to FIG. 4, the host may be presented with the option, e.g., an "Admit" button in a GUI 400, to admit participants to the main meeting from a waiting room. After the host selects an option to admit a participant into the main meeting 332 (or another meeting, e.g., sub-meeting 334), the host client device 326 may transmit a command to the video conference provider 310 to admit the first client device 320 into the main meeting 332.

At block 720, the video conference provider 310 connects the first client device 320 to the main meeting 332. To connect the first client device 320 to the main meeting 332, the video conference provider 310 provides a meeting identifier or other information to the first client device to enable it to access multimedia streams associated with the main meeting 332. In addition, the video conference provider provides a cryptographic key (or keys) to the first client device 320 to allow it to access multimedia streams from other participants and to encrypt and provide its own multimedia streams.

At block 730, the video conference provider 310 disconnects the first client device 320 from the waiting room 350. In this example, the video conference provider 310 transmits one or more messages to the first client device 320 instructing it to disconnect from the waiting room 350. However, in some examples, the first client device 320 disconnects from the waiting room 350 upon being connected to the main meeting 332. In one such examples, the functionality at block 720 necessarily causes the functionality at block 730 to be performed. In other examples, these two blocks may be performed discretely from each other. In some examples, the video conference provider 310 may disconnect the first client device 320 from the waiting room 350 by sending a message to invalidate the cryptographic key(s) provided to access multimedia content in the waiting room 350. Further, the video conference provider 310 may terminate the waiting room 350 when no new participants remain in the waiting room 350, or it may maintain the waiting room for the duration of the video conference 320 in case other participants attempt to join. Still other techniques may be employed in different examples.

Referring now to FIG. 6C, FIG. 6C shows additional functionality that may be integrated with the example method 600 shown in FIG. 6A. As with FIG. 6A, the discussion of this figure will be made with reference to the system 300 of FIG. 3, but could be used with any suitable system according to this disclosure.

At block 810, the video conference provider 310 receives second multimedia content from the host client device. As discussed above with respect to block 650, the video conference provider 310 may receive multimedia content from a participant in the waiting room 350. Once the host client device 326 has joined the waiting room 350, it is able to supply multimedia streams in generally the same manner as the first client device 320 as described with respect to block 650.

At block 820, the video conference provider 310 provides the second multimedia content to the first client device 320 generally as discussed above with respect to block 660.

Referring now to FIG. 6D, FIG. 6D shows additional functionality that may be integrated with the example method 600 shown in FIG. 6A. As with FIG. 6A, the discussion of this figure will be made with reference to the system 300 of FIG. 3, but could be used with any suitable system according to this disclosure.

At block 910, the video conference provider 310 receive a request from a second client device to join the video conference 330 generally as discussed above with respect to block 610.

At block 920, the video conference provider 320 connects the second client device to the sub-meeting (waiting room 350 in this example) generally as discussed above with respect to block 620. In this example, the video conference provider 310 connects the second client device to the waiting room 350 in this example while the first client device 320 is still connected to the waiting room 350. However, because the waiting room 350 in this example is not intended as a forum for participants to interact with other participants, but only with the host, when the video conference provider 310 connects the second client device to the waiting room 350, the first client device 320 is not notified that the second client device has joined. Further, the second client device is not notified that the first client device 320 is connected to the waiting room. However, in some examples, the participants in the waiting room may be able to interact with each other, such as they could in a breakout room 334 or the main meeting 332.

At block 930, the video conference provider 310 receives second multimedia content from the second client device generally as described above with respect to block 650.

At block 940, the video conference provider 310 provides the second multimedia content to the host client device generally as described above with respect to block 660.

At block 950, the video conference provider 310 does not provide the second multimedia content to the first client device 320. As discussed above, the waiting room 350 in this example is configured to prevent participants in the waiting room 350 from interacting with any participant other than the host. Thus, while the client devices may provide multimedia content, e.g., multimedia streams, to the video conference provider 310, the video conference provider 310 only provides those streams to the host and not to any other participant in the waiting room 350.

At block 960, the video conference provider 310 receives a selection of a client device from the host client device 320. In a scenario where multiple new participants have joined the same waiting room, the host may have the option to scroll through the different participants, such as by using the GUI 400 shown in FIG. 4. As may be seen in the waiting room region 430, the participant view 432 has "<" and ">" controls to allow the host to scroll between different participants in the waiting room. By scrolling to different participants, the host is able to select different participants, and thereby their respective client devices. Thus, the multimedia streams exchanged 346 by the host client device 326 may include more or different multimedia streams 348 than the participants may exchange. The inputs to select different participants may cause commands to be sent to the video conference provider 310 to select a particular participant to interact with. Further, in some examples, the host may select an option to broadcast their multimedia streams to all participants in the waiting room, such as to explain a delay to an upcoming meeting.

At block 970, the video conference provider 310 receives host multimedia content from the host client device generally as described above with respect to block 810.

At block 980, the video conference provider 310 provides the host multimedia content to only the selected client device(s). The video conference provider 310 provides the host multimedia content generally as described above with respect to block 820. To ensure the content is only sent to the selected client(s), the video conference provider 310 may provide multiple different multimedia streams from the host, with different subsets of the streams assigned to different client devices. Thus, after receiving the selection of the client device, the video conference provider 310 can output the received multimedia content to the appropriate multimedia stream. In some examples, however, the video conference provider 310 may disconnect client devices from the host's multimedia streams that have not been selected, thus ensuring that those client devices cannot receive multimedia content from the host client device 326. Further, as discussed above with respect to FIG. 4, in some examples, the host may wish to broadcast content to all participants in the waiting room 350, and may use a GUI to make such a selection. Thus, the host may select all participants and the video conference provider 310 provides the host multimedia content to all client devices connected to the waiting room 350.

Figure 7:
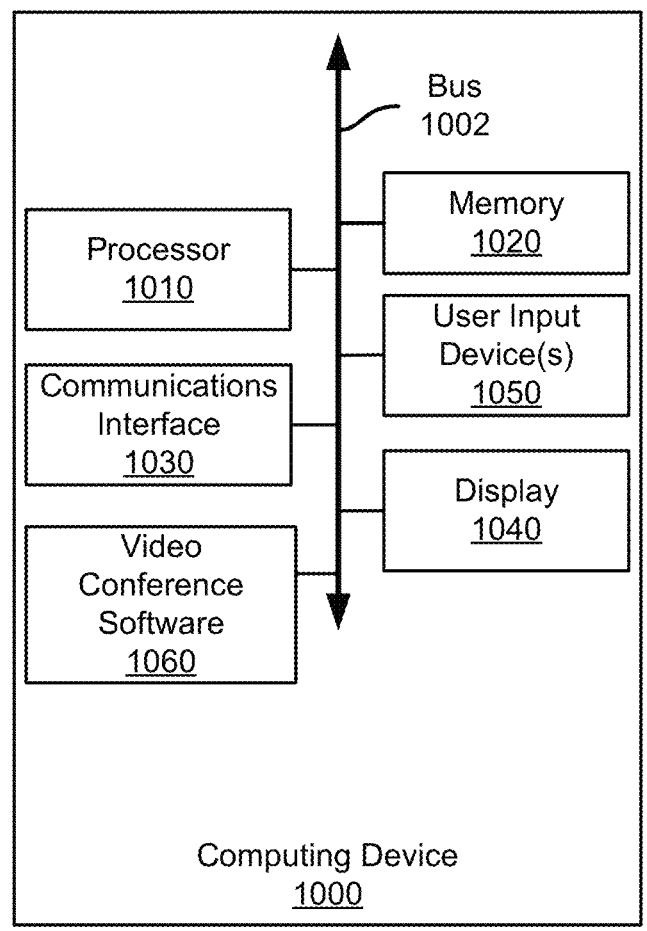
FIG. 7 shows an example computing device suitable for use with systems and methods for enabling two-way communication with video conference waiting rooms.

Referring now to FIG. 7, FIG. 7 shows an example computing device 1000 suitable for use in example systems or methods for providing dynamic content to video conference waiting rooms according to this disclosure. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for providing dynamic content to video conference waiting rooms according to different examples, such as part or all of the example methods described above with respect to FIGS. 6A-6D. The computing device 1000, in this example, also includes one or more user input devices 1050, such as a keyboard, mouse, touchscreen, microphone, etc., to accept user input. The computing device 1000 also includes a display 1040 to provide visual output to a user.

In addition, the computing device 1000 includes video conference software 1060 to enable a user to join and participate in a video conference, such as a conventional meeting or webinar, by receiving multimedia streams from a video conference provider, sending multimedia streams to the video conference provider, joining and leaving breakout rooms, such as described throughout this disclosure, etc.

The computing device 1000 also includes a communications interface 1040. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
receiving, from a first client device, a request to join a video conference, the video conference having a main meeting;
creating, in response to the request, a sub-meeting of the main meeting;
connecting the first client device to the sub-meeting without connecting the first client device to the main meeting;
connecting a host client device to the sub-meeting without disconnecting the host client device from the main meeting, the host client device exchanging multimedia streams with both the main meeting and the sub-meeting, the host client device associated with a host of the main meeting;
receiving first multimedia content from the first client device; and
providing the first multimedia content to the host client device.

2. The method of claim 1, further comprising:
receiving, from the host client device, a command to admit the first client device to the main meeting;
connecting the first client device to the main meeting; and
disconnecting the first client device from the sub-meeting.

3. The method of claim 1, further comprising:
receiving second multimedia content from the host client device; and
providing the second multimedia content to the first client device.

4. The method of claim 1, further comprising:
receiving, from a second client device, a second request to join the video conference;
connecting the second client device to the sub-meeting;
receiving second multimedia content from the second client device;
providing the second multimedia content to the host client device;
not providing the second multimedia content to the first client device; and
not providing the first multimedia content to the second client device.

5. The method of claim 4, further comprising:
receiving third multimedia content from the host client device;
providing the third multimedia content to the first client device; and
not providing the third multimedia content to the second client device.

6. The method of claim 4, further comprising:
receiving third multimedia content from the host client device; and
providing the third multimedia content to the first and second client devices.

7. The method of claim 1, wherein the first multimedia content comprises a text message or audio content.

8. The method of claim 1, wherein the first multimedia content comprises video content.

9. A system comprising:
a communications interface;
a non-transitory computer-readable medium; and
one or more processors configured to execute processor-executable instructions stored in the non-transitory computer-readable medium to:
receive, from a first client device, a request to join a video conference, the video conference having a main meeting;
create, in response to the request, a sub-meeting of the main meeting;
connect the first client device to the sub-meeting without connecting the first client device to the main meeting;
connect a host client device to the sub-meeting without disconnecting the host client device from the main meeting, the host client device exchanging multimedia streams with both the main meeting and the sub-meeting, the host client device associated with a host of the main meeting;
receive first multimedia content from the first client device; and
provide the first multimedia content to the host client device.

10. The system of claim 9, wherein the one or more processors are configured to execute further processor-executable instructions stored in the non-transitory computer-readable medium to:
receive, from the host client device, a command to admit the first client device to the main meeting;
connect the first client device to the main meeting; and
disconnect the first client device from the sub-meeting.

11. The system of claim 9, wherein the one or more processors are configured to execute further processor-executable instructions stored in the non-transitory computer- readable medium to:
receive second multimedia content from the host client device; and
provide the second multimedia content to the first client device.

12. The system of claim 9, wherein the one or more processors are configured to execute further processor-executable instructions stored in the non-transitory computer-readable medium to:
receive, from a second client device, a second request to join the video conference;
connect the second client device to the sub-meeting;
receive second multimedia content from the second client device;
provide the second multimedia content to the host client device;
not provide the second multimedia content to the first client device; and
not provide the first multimedia content to the second client device.

13. The system of claim 12, wherein the one or more processors are configured to execute further processor-executable instructions stored in the non-transitory computer-readable medium to:
receive third multimedia content from the host client device;
provide the third multimedia content to the first client device; and
not provide the third multimedia content to the second client device.

14. The system of claim 12, wherein the one or more processors are configured to execute further processor-executable instructions stored in the non-transitory computer-readable medium to:
    receive third multimedia content from the host client device; and
    provide the third multimedia content to the first and second client devices.

15. The system of claim 9, wherein the first multimedia content comprises a text message or audio content.

16. The system of claim 9, wherein the first multimedia content comprises video content.

17. A non-transitory computer-readable medium comprising processor-executable instructions configured to cause one or more processors to:
    receive, from a first client device, a request to join a video conference, the video conference having a main meeting;
    create, in response to the request, a sub-meeting of the main meeting;
    connect the first client device to the sub-meeting without connecting the first client device to the main meeting;
    connect a host client device to the sub-meeting without disconnecting the host client device from the main meeting, the host client device exchanging multimedia streams with both the main meeting and the sub-meeting, the host client device associated with a host of the main meeting;
    receive first multimedia content from the first client device; and
    provide the first multimedia content to the host client device.

18. The non-transitory computer-readable medium of claim 17, further comprising processor-executable instructions to:
    receive, from the host client device, a command to admit the first client device to the main meeting;
    connect the first client device to the main meeting; and
    disconnect the first client device from the sub-meeting.

19. The non-transitory computer-readable medium of claim 17, further comprising processor-executable instructions to:
    receive second multimedia content from the host client device; and
    provide the second multimedia content to the first client device.

20. The non-transitory computer-readable medium of claim 17, further comprising processor-executable instructions to:
    receive, from a second client device, a second request to join the video conference;
    connect the second client device to the sub-meeting;
    receive second multimedia content from the second client device;
    provide the second multimedia content to the host client device;
    not provide the second multimedia content to the first client device; and
    not provide the first multimedia content to the second client device.

21. The non-transitory computer-readable medium of claim 20, further comprising processor-executable instructions to:
    receive third multimedia content from the host client device;
    provide the third multimedia content to the first client device; and
    not provide the third multimedia content to the second client device.

22. The non-transitory computer-readable medium of claim 20, further comprising processor-executable instructions to:
    receive third multimedia content from the host client device; and
    provide the third multimedia content to the first and second client devices.

23. The non-transitory computer-readable medium of claim 17 wherein the first multimedia content comprises a text message or audio content.

24. The non-transitory computer-readable medium of claim 17, wherein the first multimedia content comprises video content.

* * * * *